T. A. STUDDARD.
SHOCK ABSORBER FOR AUTOMOBILES.
APPLICATION FILED JAN. 7, 1922.

1,418,105.

Patented May 30, 1922.

INVENTOR
Thomas A. Studdard
BY Adam E. Fisher
ATTORNEY

UNITED STATES PATENT OFFICE.

THOMAS A. STUDDARD, OF CARBON HILL, ALABAMA.

SHOCK ABSORBER FOR AUTOMOBILES.

1,418,105.          Specification of Letters Patent.     Patented May 30, 1922.

Application filed January 7, 1922. Serial No. 527,534.

*To all whom it may concern:*

Be it known that I, THOMAS A. STUDDARD, a citizen of the United States, residing in the city of Carbon Hill, State of Alabama, have invented new and useful Improvements in Shock Absorbers for Automobiles, of which the following is a specification, reference being had to the accompanying drawings.

This invention is a shock absorber for Ford automobiles, and the object is to provide a simple and practical device of this kind, which may be readily installed on any Ford machine.

Figure 1:
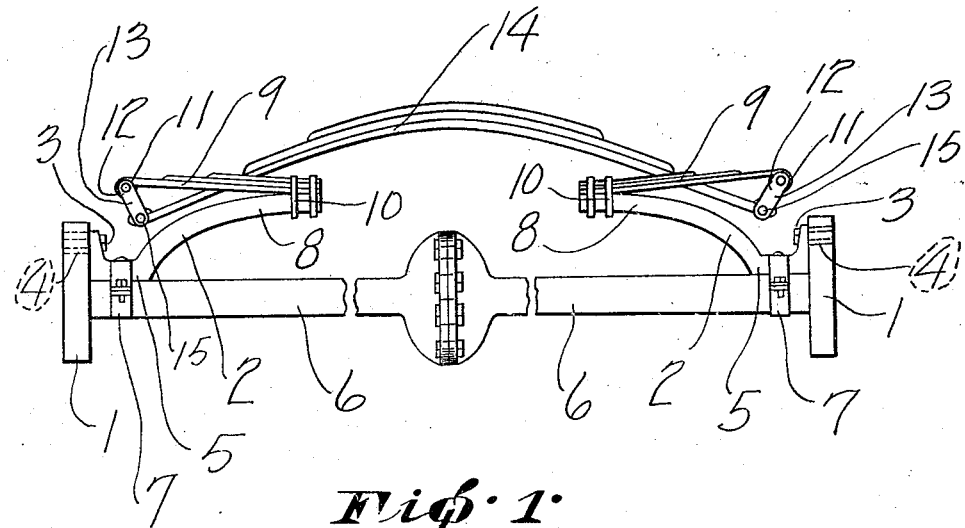
Figure 1 is an elevation of the device installed on the car.
Figure 2:
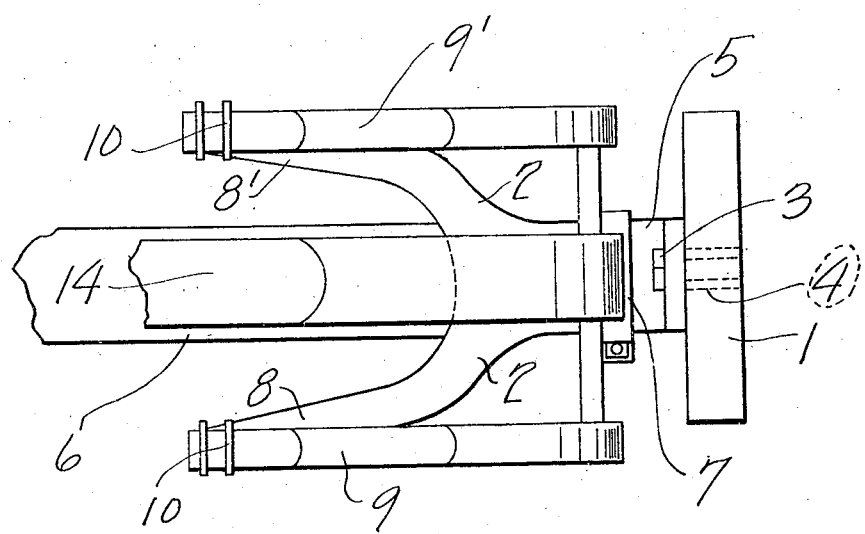
Figure 2 is a plan view.

In carrying out this invention the perch is removed from the axle housing flange 1, and a forked, arcuate arm 2 is secured by means of a bolt 3 in the perch hole 4 of the said flange 1. The arm 2 has a shank portion 5 which rests upon the axle housing 6 and is secured thereto by a clamp 7. The arcuate portion of the arm is bifurcate or forked as shown at 8 and 8' in Figure 2. Leaf springs 9 and 9' have their inner ends secured by clamps 10 to the ends of the forks 8 and 8', while the outer ends are provided with eyes 11 for engaging the ends 12 of the spring hanger 13, this hanger in turn supporting the end of usual spring 14 at the point 15.

While I have herein described a certain specific method of constructing and assembling the elements of my invention, it is understood same may be varied in minor details, not departing from the spirit of my invention as defined in the appended claim.

I claim:

A shock absorber for automobiles, comprising a bifurcate, arcuate arm having a shank portion secured to the axle housing and flange; and leaf springs secured at their inner ends to the ends of the forks of the arm and having their outer ends swingingly connected to the end of the ordinary spring.

THOMAS A. STUDDARD.

Witnesses:
   KARL E. KROPP,
   O. H. WHITNY.